B. W. KADEL.
BRAKE ARRANGEMENT FOR SIX WHEEL CAR TRUCKS.
APPLICATION FILED FEB. 26, 1915.

1,156,483.

Patented Oct. 12, 1915.

Witnesses
M. H. Martin
John A. Pilcher

Inventor
Byers W. Kadel.

UNITED STATES PATENT OFFICE.

BYERS W. KADEL, OF ROANOKE COUNTY, VIRGINIA.

BRAKE ARRANGEMENT FOR SIX-WHEEL CAR-TRUCKS.

1,156,483. Specification of Letters Patent. Patented Oct. 12, 1915.

Application filed February 26, 1915. Serial No. 10,798.

*To all whom it may concern:*

Be it known that I, BYERS W. KADEL, a citizen of the United States, residing in the county of Roanoke and State of Virginia, have invented certain new and useful Improvements in Brake Arrangements for Six-Wheel Car-Trucks, of which the following is a specification.

This invention pertains to brake arrangements for car trucks and the particular object thereof is to provide an improved arrangement of levers, beams, rods, etc.

Another object is to provide an improved form of pull-fulcrum as will be described.

The invention consists in the arrangement and the formation of parts as will be herein described and particularly claimed.

Figure 1:
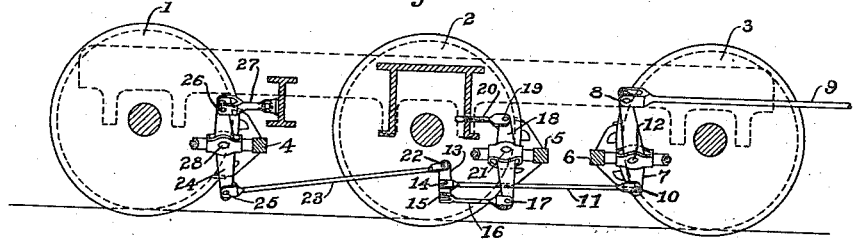
Figure 2:
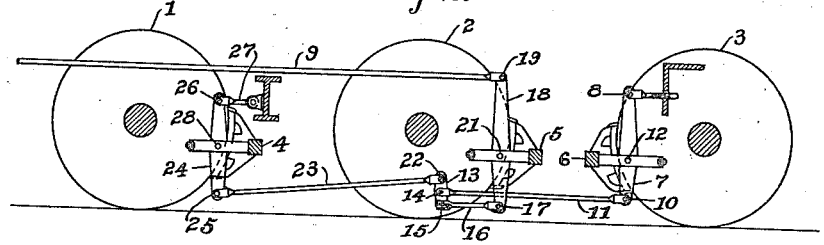
Figure 3:
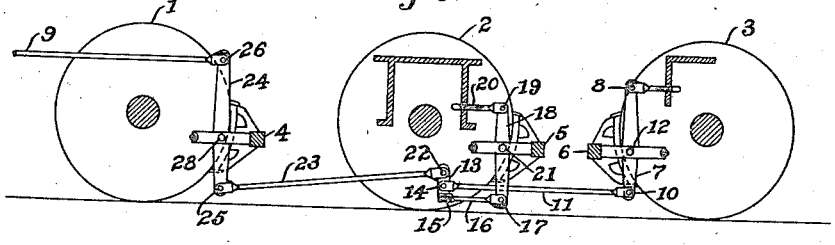
Figure 4:
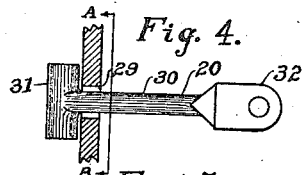
Figure 5:
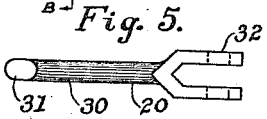
Figure 6:
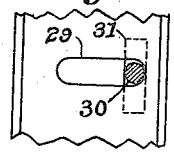

In the drawings, Figure 1 is a sectional elevation of a truck showing the application thereto of my invention, and Figs. 2 and 3 are similar views showing alternate arrangements thereof. Fig. 4 is a plan view of the fulcrum as used and Figs. 5 and 6 are side elevational and transverse sectional views respectively thereof, the latter taken on the line A B, Fig. 4.

Referring now to the drawings wherein the same parts are similarly designated wherever they occur, 1 represents the end wheels of a six-wheel truck, 2 the middle wheels thereof and 3 the other end wheels.

The brake beams 4—5 and 6 are supplied for the pairs of wheels 1—2 and 3 respectively and the beams 4 and 6 are disposed on the inner sides of the end wheels, thus constituting what is known as "inside" brakes. It will be realized that various advantages accrue from the use of these inside brakes, among which are shorter lever-actuating members and more convenient means for suspending the beams from the truck structure. For the beam 6 is provided a live lever 7 and to this lever is pivotally connected at the upper extremity thereof at 8, one end of a lever-actuating member or pull rod 9, which is operatively connected at the other end (not shown in the drawings) to the brake mechanism on the car body. To the other extremity of the live lever 7 at 10 is connected one end of the lever-actuating member or compression member 11, the brake beam 6 being fulcrumed to the lever 7 at a point 12 between the extremities 8 and 10. To the other end of the member 11 is pivotally connected an equalizing lever 13, the connection point 14 being between the extremities of the lever 13. At one of the extremities of this equalizing lever 13 is pivotally connected at 15 the one end of a second lever-actuating member or pull rod 16 and the other end of this pull rod is pivotally connected at 17 to one of the extremities of a dead lever 18. The other extremity of this dead lever 18 is fulcrumed at 19 by means of the swinging pull-fulcrum 20 to some convenient part of the truck, and the brake beam 5 is fulcrumed to this dead lever 18 at a point 21 between the extremities 17 and 19 of this lever. At the other of the extremities of the equalizing lever 13 at 22 the lever-actuating member or compression member 23 is pivotally connected thereto and this member 23 extends to and is pivotally connected to one extremity of a second dead lever 24 at 25. The other extremity of this dead lever 24 is fulcrumed at 26 by means of the fulcrum 27 to some convenient part of the car body or truck, and the brake beam 4 is fulcrumed to this lever between the extremities 25 and 26 thereof at 28.

In operation, the member 9 being actuated as a pull member, the beam 6 and the brake shoes therewith will be drawn up against the wheels 3. The lever 7 fulcruming about 12, the member 11 will be pushed back and the equalizing lever with it. This will, by means of the member 16 pull the lower end of the lever 18 toward the wheels 2, and the lever fulcruming at 19, the beam 5 and its shoes will be forced up to the wheels 2. The forward movement of the lever 13 will likewise push the member 23 ahead and in the same manner apply the brake beam 4 and its shoes to the wheels 1.

The peculiar connections of the beams, levers, and actuating members gives a brake arrangement that will, with properly proportioned parts, give a perfectly equalized brake system and one that is, under certain conditions, very desirable for application to six-wheel trucks. In Fig. 2 I have shown the lever 18 as the live lever and have made the lever 7 a dead lever, the same results being attained as before, while in Fig. 3 I have shown the lever 24 as the live lever with the lever 7 a dead lever, with the same results. It is customary to suspend the brake beams for such trucks from members that have no relative vertical movement with respect to the wheels, while it is usually necessary to affix the fulcrums such as 20, and 27 to some part of the truck or car that is carried on springs and that hence has such relative motion. Because of this it is necessary that such fulcrums be made to swing so as to allow this relative vertical movement of the two ends of the fulcrum without bending the material of the fulcrum. To accomplish this I preferably use the particular form of fulcrum 20 as shown in detail in Figs. 4-5 and 6. In some convenient and fixed part of the truck I provide an elongated hole 29 and through the same is disposed the rod 30 of the fulcrum 20. The inner end of the fulcrum is enlarged transversely at 31 and the elongated hole 29 is made suitable to admit this enlarged portion when the same is brought into registry with the length of the hole. Normally, the fulcrum 20 is turned so that the enlarged end 31 abuts the material at the sides of the hole 29 in pulling. The outer end of the fulcrum consists of a jaw 32 or other means for the attachment of the brake lever 18 and when the brake lever is so attached the fulcrum is thereby prevented from rotating to a position where the enlarged portion 31 will pass through the opening 29. At the same time the outer end or jaw 32 of the fulcrum 20 may remain stationary, vertically, while the inner end 31 moves up and down with the movements of the truck structure on the springs. When the fulcrum is not under load the rod 30 may slide up and down in the slot 29, but when the load is applied to the brake mechanism and the end 31 drawn up forcibly against the sides of the slot 29 the fulcrum will rock about the inner end 31. Thus I have formed a pull fulcrum that will prevent bending of the same and at the same time prevent false loads of the same nature being applied to the brake lever and beam.

Having thus set forth the workings of my improved brake arrangement, I claim the following:

1. In a brake arrangement for six-wheel car trucks, the combination with three brake beams of a similar number of brake levers, the said beams being fulcrumed to the said levers respectively between the extremities thereof, an equalizing lever, a lever-actuating member for each of said brake levers, the said lever-actuating members being pivotally connected at one end to their said brake levers respectively at one of the extremities of the said brake levers, and all of said lever-actuating members being pivotally connected to the said equalizing lever at their other ends, the other extremities of two of the said brake levers being fulcrumed, and actuating means pivotally connected to the other extremity of the third brake lever.

2. In a brake arrangement for six-wheel car trucks, the combination with three brake beams of a live lever to which is fulcrumed between the extremities thereof one of the said brake beams, a lever-actuating member pivotally connected at one end to the one extremity of the said live lever and at the other end to the brake mechanism of the car body, two dead levers, each of which is fulcrumed at one extremity to some convenient part of the car or truck and to each of which is fulcrumed between the extremities thereof one of the remaining two of the said brake beams, an equalizing lever, and three lever-actuating members, each of which is pivotally connected at one end to the said equalizing lever and at their other ends to the other extremities of the said live and dead levers.

3. In a brake arrangement for six-wheel car trucks, a live lever, a brake beam fulcrumed to the said live lever between the extremities thereof, a lever-actuating member pivotally connected at one end to one extremity of the said live lever, an equalizing lever to which is pivotally connected the other end of said lever-actuating member, a second lever-actuating member pivotally connected at one end to the said equalizing lever, a dead lever to which is pivotally connected at one of the extremities thereof the other end of the said second lever-actuating member, the other extremity of the said dead lever being fulcrumed to some convenient part of the truck or car, a second brake beam fulcrumed to the said dead lever between the extremities thereof, a third lever-actuating member pivotally connected at one end to the said equalizing lever, a second dead lever to which is pivotally connected at one of the extremities thereof the other end of the said third lever-actuating member, the other end of the said second dead lever being fulcrumed to some convenient part of the truck or car, a third brake beam fulcrumed to the said second dead lever between the extremities thereof, and a fourth lever-actuating member pivotally connected to the other extremity of the said live lever and by means of which the entire brake mechanism may be actuated as described.

4. In a brake arrangement for six-wheel car trucks, a live lever, a brake beam fulcrumed to the said live lever between the extremities thereof, a compression member pivotally connected at one end to one extremity of the said live lever, an equalizing lever to which is pivotally connected the other end of said compression member, a tension member pivotally connected at one end to the said equalizing lever, a dead lever to which is pivotally connected at one of the extremities thereof the other end of the said tension member, the other extremity of the said dead lever being fulcrumed to some convenient part of the truck or car, a second brake beam fulcrumed to the said dead lever between the extremities thereof, a second compression member pivotally connected at one end to the said equalizing lever, a second dead lever to which is pivotally connected at one of the extremities thereof the other end of the said second compression member, the other end of the said second dead lever being fulcrumed to some convenient part of the truck or car, a third brake beam fulcrumed to the said second dead lever between the extremities thereof, and a tension member pivotally connected to the other extremity of the said live lever and by means of which the entire brake mechanism may be actuated as described.

5. In a brake arrangement for six-wheel car trucks, a live lever, a brake beam fulcrumed to the said live lever between the extremities thereof, a compression member pivotally connected at one end to one extremity of the said live lever, an equalizing lever to which is pivotally connected between the extremities thereof the other end of said compression member, a tension member pivotally connected at one end to the said equalizing lever at one of the extremities thereof, a dead lever to which is pivotally connected at one of its extremities the other end of the said tension member, the other extremity of the said dead lever being fulcrumed to some convenient part of the truck or car, a second brake beam fulcrumed to the said dead lever between the extremities thereof, a second compression member pivotally connected at one end to the other extremity of the said equalizing lever, a second dead lever to which is pivotally connected at one of its extremities the other end of the said second compression member, the other end of the said second dead lever being fulcrumed to some convenient part of the truck or car, a third brake beam fulcrumed to the said second dead lever between the extremities thereof, and a tension member pivotally connected to the other extremity of the said live lever and by means of which the entire brake mechanism may be actuated as described.

6. In a brake arrangement for car trucks, a fixed portion of the car or truck having an elongated opening therethrough, in combination with a swinging pull-fulcrum, the said fulcrum comprising a rod passing through the said hole, the inner end of the said rod having a transversely enlarged portion adapted to pass through the said elongated hole when brought into registry therewith and adapted to swingingly abut the material at the sides of the hole when not registering therewith, and a brake lever, the outer end of the said rod having means for attachment thereto of the said brake lever and said brake lever being adapted to prevent the rotation of the said rod into engagement with the said elongated hole.

In testimony whereof I affix my signature in presence of two witnesses.

BYERS W. KADEL.

Witnesses:
 JOHN A. PILCHER,
 H. B. WADE.